United States Patent
Xiao et al.

(10) Patent No.: US 12,449,618 B2
(45) Date of Patent: Oct. 21, 2025

(54) LOW-LOSS COPLANAR WAVEGUIDE BONDING STRUCTURE AND MANUFACTURING METHOD THEREOF

(71) Applicant: BEIHANG UNIVERSITY, Beijing (CN)

(72) Inventors: Chen Xiao, Beijing (CN); Rui Xu, Beijing (CN); Boyu Zhang, Beijing (CN); Xiangyu Zheng, Beijing (CN); Wenlong Cai, Beijing (CN); Jiaqi Wei, Beijing (CN); Weisheng Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 247 days.

(21) Appl. No.: 18/363,984

(22) Filed: Aug. 2, 2023

(65) Prior Publication Data
US 2024/0045160 A1    Feb. 8, 2024

(30) Foreign Application Priority Data
Aug. 2, 2022    (CN) .......................... 202210924721.6

(51) Int. Cl.
*G02B 6/42*    (2006.01)

(52) U.S. Cl.
CPC .......... *G02B 6/4283* (2013.01); *G02B 6/4279* (2013.01)

(58) Field of Classification Search
CPC .. G02B 6/4283; G02B 6/4279; G02B 6/2935; G02B 6/29352; G02B 6/29353; G02B 6/29355; G02F 1/212
See application file for complete search history.

(56) References Cited

U.S. PATENT DOCUMENTS

| | | | |
|---|---|---|---|
| 2010/0258543 A1 | 10/2010 | Mizuno et al. | |
| 2022/0326587 A1* | 10/2022 | Ozaki | ..................... G02F 1/225 |

FOREIGN PATENT DOCUMENTS

| | | |
|---|---|---|
| CN | 104058393 A | 9/2014 |
| CN | 111192822 A | 5/2020 |
| CN | 112713374 A | 4/2021 |

(Continued)

OTHER PUBLICATIONS

First Office Action issued in counterpart Chinese Patent Application No. 202210924721.6, dated Dec. 5, 2022.

(Continued)

*Primary Examiner* — Chad H Smith
(74) *Attorney, Agent, or Firm* — Westbridge IP LLC

(57) ABSTRACT

Disclosed are a low-loss coplanar waveguide bonding structure and a manufacturing method thereof, relating to the technical field of semiconductor. The low-loss coplanar waveguide bonding structure includes: a first coplanar waveguide on a first substrate, a second coplanar waveguide on a second substrate and having a same structure as the first coplanar waveguide, and a plurality of two-dimensional heterostructures connecting conductors of the first coplanar waveguide and the second coplanar waveguide in a one-to-one correspondence, where the two-dimensional heterostructures includes: a two-dimensional conductive material layer for signal transmission and a two-dimensional dielectric material layer under the two-dimensional conductive material layer.

8 Claims, 6 Drawing Sheets

(56) References Cited

FOREIGN PATENT DOCUMENTS

| | | |
|---|---|---|
| CN | 113109901 A | 7/2021 |
| CN | 114006158 A | 2/2022 |
| CN | 114019619 A | 2/2022 |
| EP | 1530249 A1 | 5/2005 |

OTHER PUBLICATIONS

First Search Report issued in counterpart Chinese Patent Application No. 202210924721.6, dated Nov. 8, 2022.
Parhizkar et al., Two-Dimensional Platinum Diselenide Waveguide-Integrated Infrared Photodetectors, ACS Photonics, 2022, 9, pp. 859-867, dated Mar. 4, 2022.
Supplementary Search Report issued in counterpart Chinese Patent Application No. 202210924721.6, dated Apr. 28, 2023.

* cited by examiner

LOW-LOSS COPLANAR WAVEGUIDE BONDING STRUCTURE AND MANUFACTURING METHOD THEREOF

CROSS-REFERENCE TO RELATED APPLICATIONS

This application claims priority to Chinese Patent Application No. 202210924721.6, filed on Aug. 2, 2022, the content of which is incorporated herein by reference in its entirety.

TECHNICAL FIELD

The disclosure relates to the technical field of semiconductor and, in particular to a low-loss coplanar waveguide bonding structure and a manufacturing method thereof.

BACKGROUND

With increasing of operating speed of integrated circuits, a response time of a plurality of integrated circuit devices is less than ten picoseconds, and a test system is required to have DC-hGHz bandwidth, which poses a severe challenge to signal integrity of a pulse signal source and a transmission link. On the one hand, it is difficult for a commercial pulse signal source to meet requirements of gain, bandwidth and low jitter at the same time, so integrating a pulse signal source and a device under test (DUT) on a same chip is an important solution. On the other hand, common transmission lines and a connection method thereof also have an important high-frequency dispersion and transmission loss problem. Coplanar waveguide (CPW) is a common high-frequency signal transmission line, can undertake a transmission function between the pulse signal source and the device under test (DUT). However, core components of the pulse signal source, such as a photoconductive switch (PCS), are typically processed on III-V group material substrates, they are incompatible with a silicon substrate commonly used in an integrated circuit DUT, and also incompatible with organic resin or ceramic substrates used in a conventional printed circuit board (PCB). Therefore, the industry usually adopts a bonding process to connect the PCS, DUT and PCB. A common practice is to connect metal conductors on different substrates by means of conductive metal wires or inverted bonding to ensure transmission of electrical signals. However, sizes of graphical circuits attached to or around the PCS, DUT and PCB are even more disparate under higher requirements of transmission bandwidth. The sizes of these graphical circuits, i.e., CPW, are comparable to wavelengths of transmitted electrical signals. Inhomogeneity in overall transmission link caused by changing of sizes or connection methods may cause great damage to the integrity of high-frequency signals, thereby affecting reliability of the test system.

For example, in a high-frequency band, gold wire bonding is one of the most used interconnection methods for the coplanar waveguide on the PCB, and surface metals of a transition structure is connected by gold wires. The gold wire bonding includes two types such as microstrip line and coplanar waveguide, according to different requirements. Due to the high-frequency band of the transmission signal, the gold wires have an apparent parasitic effect, the loss caused by the gold wire bonding increases, and results in parasitic inductance. As the operating frequency increases, the parasitic inductance of the gold wires results in large inhomogeneity. Especially in a terahertz frequency band, the parasitic inductance of the gold wires causes significant signal reflection, and these inhomogeneities also cause a significant decrease in signal transmission bandwidth and a significant increase in signal transmission loss. In addition, there is also a method to invert the coplanar waveguide and bond the coplanar waveguide to the circuit by applying a conductive adhesive. However, the conductive adhesive needs to be manually applied, which results in low alignment accuracy, large process error and poor repeatability of the results.

SUMMARY

To address the problems in the prior art, the disclosure provides a low-loss coplanar waveguide bonding structure, including:
  a first coplanar waveguide on a first substrate;
  a second coplanar waveguide on a second substrate and having a same structure as the first coplanar waveguide; and
  a plurality of two-dimensional heterostructures uniformly covering and connecting conductors of the first coplanar waveguide and the second coplanar waveguide in a one-to-one correspondence,
  where the two-dimensional heterostructures includes: a two-dimensional conductive material layer for signal transmission and a two-dimensional dielectric material layer under the two-dimensional conductive material layer.

In one embodiment, the first substrate and the second substrate are different in materials.

In one embodiment, a size of the first coplanar waveguide is larger than that of the second coplanar waveguide.

In one embodiment, the first substrate includes a slot matching the second substrate;
  the second substrate is nested and fixed in the slot, and the first coplanar waveguide and the second coplanar waveguide are located on a same plane without contact.

In one embodiment, a size of a first end of each conductor of the second coplanar waveguide is larger than that of a second end, and the first end of each conductor of the second coplanar waveguide is connected to the two-dimensional heterostructures.

In one embodiment, the first coplanar waveguide includes: a GS structure, an SG structure or a GSG structure.

In one embodiment, the two-dimensional conductive material layer is made from one of graphene, black phosphorus, Te, ZrGeSe or ZrGeTe.

In one embodiment, the two-dimensional dielectric material layer is made from hBN or $hY_2O_3$.

The disclosure also provides a method for manufacturing the low-loss coplanar waveguide bonding structure, including:
  fixing a first coplanar waveguide and a second coplanar waveguide on a same horizontal plane;
  forming an insulating and flat two-dimensional dielectric material layer at interfaces of corresponding conductors of the first coplanar waveguide and the second coplanar waveguide;
  removing a substrate residual metal on the two-dimensional dielectric material layer;
  patterning the two-dimensional dielectric material layer using femtosecond laser;
  forming a two-dimensional conductive material layer on the two-dimensional dielectric material layer, the first coplanar waveguide and the second coplanar waveguide;

removing a substrate residual metal on the two-dimensional conductive material layer;

patterning the two-dimensional conductive material layer using femtosecond laser, where the two-dimensional conductive material layer completely covers the two-dimensional dielectric material layer and is connected to corresponding conductors of the first coplanar waveguide and the second coplanar waveguide, respectively.

The low-loss coplanar waveguide bonding structure of the disclosure bonds coplanar waveguides by two-dimensional conductive materials and reduces skin effect losses taking advantage of high electrical conductivity of the two-dimensional conductive materials. The two-dimensional conductive materials can uniformly cover the surfaces of conductors that need to be connected, which improves the uniformity of the transmission line in the bonding part, ultimately reduces the high-frequency transmission reflection and guarantees the transmission bandwidth, and a non-destructive contact is performed between the two-dimensional conductive materials and metals, no solder joints needs to be formed to avoid damage to metal electrodes, and is applied to connection between ultra-thin metal electrodes.

BRIEF DESCRIPTION OF THE DRAWINGS

In order to more clearly explain the embodiments of the disclosure, drawings that need to be used in the description of the embodiments will be simply introduced below, obviously the drawings in the following description are merely some examples of the disclosure, for the person skilled in the art, it is also possible to obtain other drawings according to these drawings without making creative efforts, where.

DETAILED DESCRIPTION OF THE EMBODIMENTS

To make the objective, technical solutions and advantages of the embodiments of the disclosure more clear, the embodiments of the disclosure will be further described in detail below with reference to the accompanying drawings. Here, the exemplary embodiments and description of the disclosure are used to demonstrate the disclosure, but not used to limit the disclosure.

The disclosure provides a low-loss coplanar waveguide bonding structure, suitable for connections between corresponding conductors of two coplanar waveguides, especially suitable for connections between two coplanar waveguides with different sizes. The disclosure describes the low-loss coplanar waveguide bonding structure of the disclosure in detail in embodiments. Those skilled in the art should appreciate that the embodiments and the related drawings are examples provided in the disclosure, which are only used for illustration, but not intended to limit the disclosure.

Figure 1A:
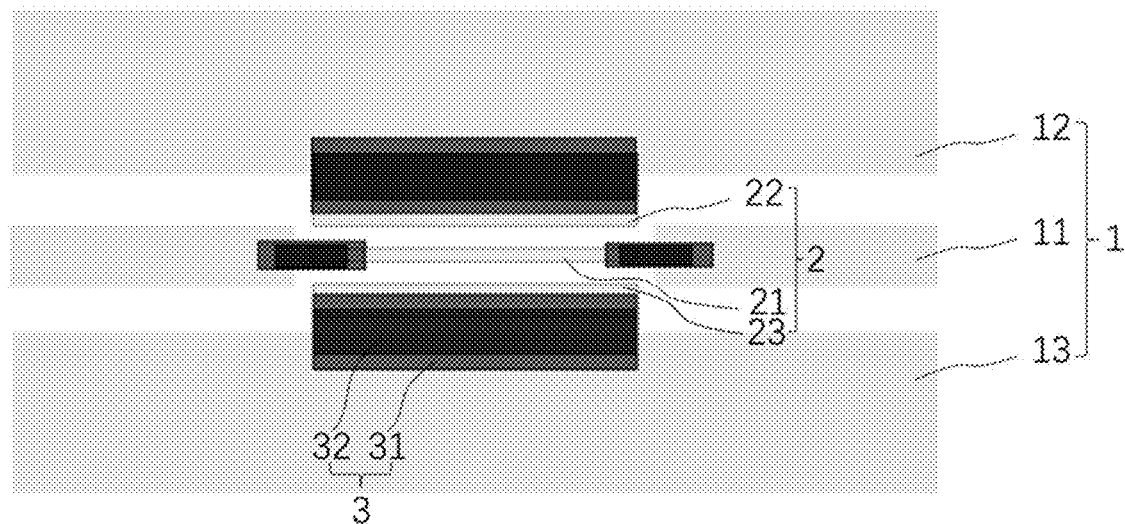
FIGS. 1A to 1C are three-view drawings illustrating a low-loss coplanar waveguide bonding structure provided in the disclosure.
Figure 1B:
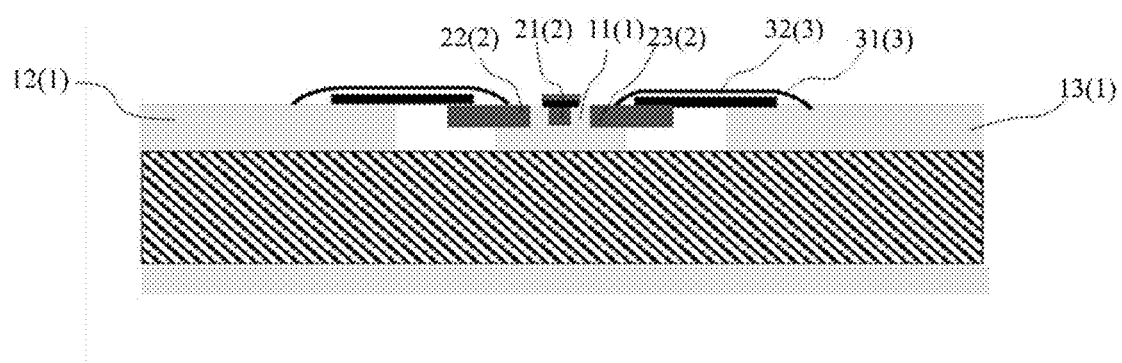
Figure 1C:
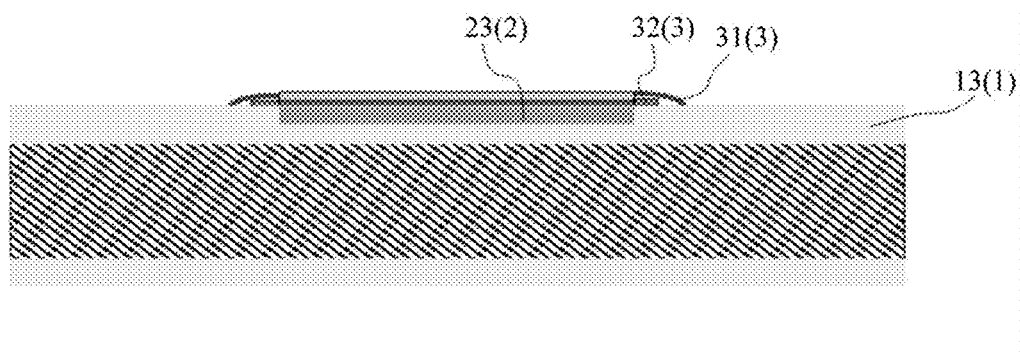

As shown in FIGS. 1A and 1C, the low-loss coplanar waveguide bonding structure provided in the disclosure includes: a first coplanar waveguide 1 on a first substrate, a second coplanar waveguide 2 on a second substrate, and a two-dimensional heterostructure 3 connecting conductors of the first coplanar waveguide 1 and the second coplanar waveguide 2 in a one-to-one correspondence.

The first coplanar waveguide 1 and the second coplanar waveguide 2 have the same structure. The first coplanar waveguide 1 includes: a signal conductor 11, a ground conductor 12 and a ground conductor 13, and the second coplanar waveguide 2 includes: a signal conductor 21, a ground conductor 22 and a ground conductor 23. The corresponding conductors of the first coplanar waveguide 1 and the second coplanar waveguide 2 in the disclosure refer to the conductors for which a connection needs to be established. FIG. 1A includes three sets of corresponding conductors, i.e., the signal conductor 11 of the first coplanar waveguide 1 and the signal conductor 21 of the second coplanar waveguide 2, the ground conductor 12 of the first coplanar waveguide 1 and the ground conductor 22 of the second coplanar waveguide 2, and the ground conductor 13 of the first coplanar waveguide 1 and the ground conductor 23 of the second coplanar waveguide 2. Each set of corresponding conductors is connected by a two-dimensional heterostructure 3.

As can be explicitly seen from FIG. 1B, the two-dimensional heterostructure 3 includes a two-dimensional conductive material layer 31 and a two-dimensional dielectric material layer 32, where the two-dimensional dielectric material layer 32 directly contacts and covers two conductors to be connected, the two-dimensional conductive material layer 31 is covered on the two-dimensional dielectric material layer 32, and the two ends of the two-dimensional conductive material layer 31 are directly contacted and fixed with the two conductors to be connected, respectively.

The two-dimensional conductive material layer 31 is used to transmit a signal between two conductors, and a material of the conductive material layer 31 includes, but is not limited to at least one of graphene, black phosphorus, Te, ZrGeSe or ZrGeTe. The two-dimensional dielectric material layer 32 is made from an insulating material with a flat surface, which includes but is not limited to hBN or $hY_2O_3$. The two-dimensional dielectric material layer 32 supports the two-dimensional conductive material layer 31, enhances the connection between the metal conductors and the two-dimensional conductive materials, can avoid defect wrinkles and pressure deformation of the two-dimensional conductive material layer 31 and prevent a decrease in the conductivity of the two-dimensional conductive material layer 31.

The size of the first coplanar waveguide shown in FIGS. 1A to 1C is larger than that of the second coplanar waveguide, but it does not mean that the disclosure is only applicable to the connection between coplanar waveguides with different sizes. The disclosure is also applicable to the connection of transmission structures with a same size, such as coplanar waveguides and microstrip lines.

The common coplanar waveguides in the art mainly includes: a GSG structure, a GS structure or an SG structure. The structures of the first coplanar waveguide and the second coplanar waveguide shown in FIGS. 1A to 1C are GSG structures. The disclosure is also applicable to the connection between the coplanar waveguides with the GS structure and the connection between the coplanar waveguides with the SG structure. "The structures of the first coplanar waveguide 1 and the second coplanar waveguide 2 are the same" in the embodiments refers to that both the first coplanar waveguide 1 and the second coplanar waveguide 2 are the GSG structure, or both the first coplanar waveguide 1 and the second coplanar waveguide 2 are the GS structure, or both the first coplanar waveguide 1 and the second coplanar waveguide 2 are the SG structure.

In one embodiment, the first substrate and the second substrate are different in materials. In this case, the first substrate and the second substrate are fixed, so that corresponding conductors of the first coplanar waveguide on the first substrate and the second coplanar waveguide on the second substrate are placed in proper positions, that is, the corresponding conductors can be connected using 2D heterostructures.

Figure 2:
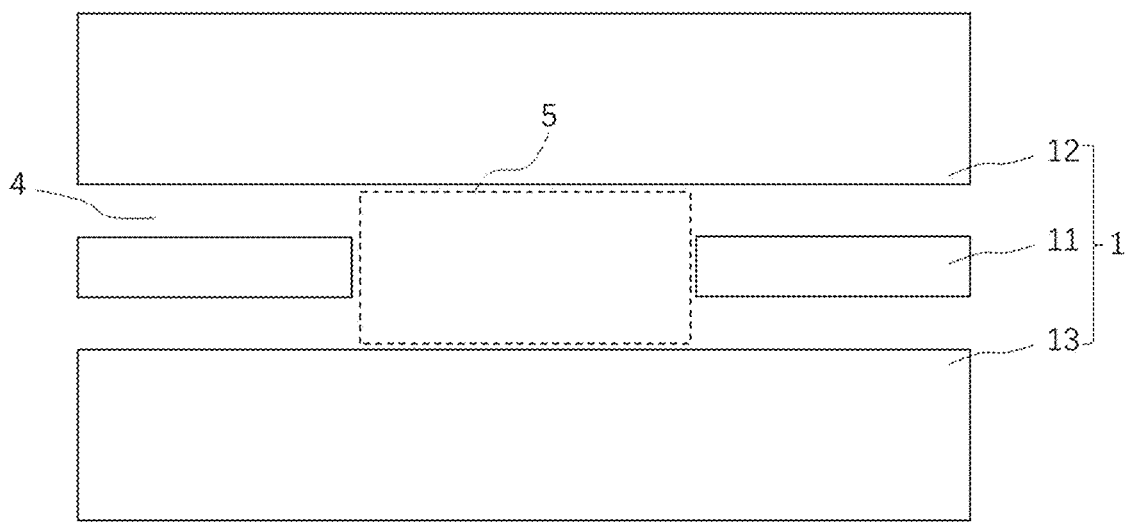
FIG. 2 is a diagram illustrating a first substrate and a first coplanar waveguide provided in the disclosure.

Specifically, as shown in FIG. 2, the first coplanar waveguide 1 and a slot 5 are disposed on a first substrate 4. The first coplanar waveguide 1 includes the signal conductor 11, the ground conductor 12 and the ground conductor 13. The signal conductor 11 includes two sections. The slot 5 is disposed between the two sections of the signal conductor 11.

Figure 3:
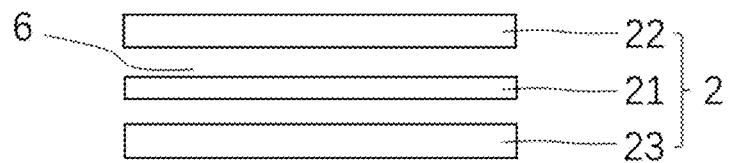
FIG. 3 is a diagram illustrating a second substrate and a second coplanar waveguide provided in the disclosure.
Figure 4:
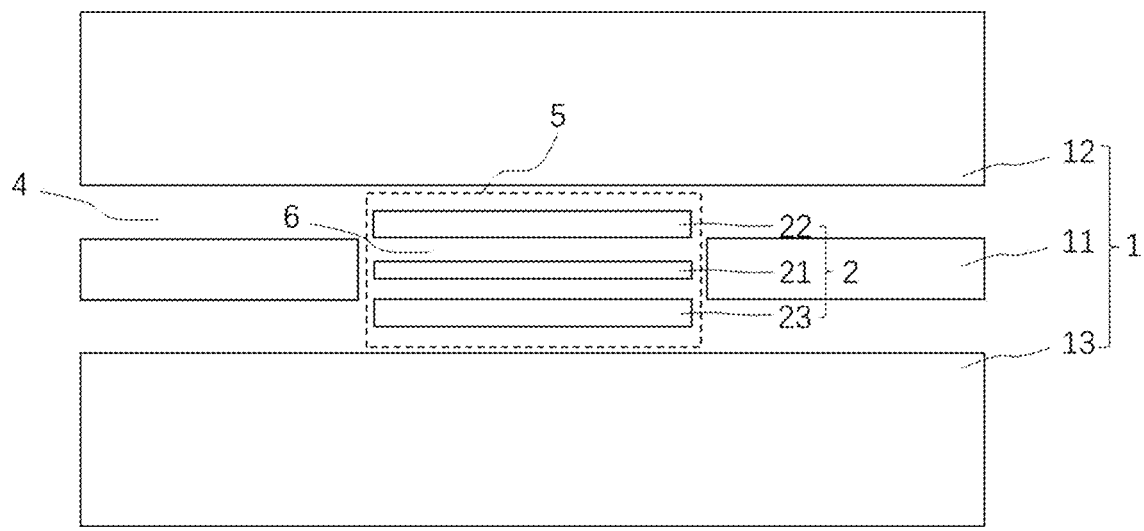
FIG. 4 is a diagram illustrating the second substrate nested in the slot of the first substrate provided in the disclosure.

As shown in FIG. 3, the second coplanar waveguide 2 is disposed on a second substrate 6, and the second coplanar waveguide includes a signal conductor 21, a ground conductor 22 and a ground conductor 23. The second substrate 6 matches the slot 5 on the first substrate 4 in shape, so that the second substrate 6 can be nested in the slot 5, and when the second substrate 6 is nested and fixed in the slot 5, the first coplanar waveguide 1 on the first substrate 4 and the second coplanar waveguide 2 on the second substrate 6 are located on a same plane. To ensure accurate and firm fitting of different substrates, an adhesive can also be applied within the slot 5. FIG. 4 is a diagram illustrating the second substrate 6 nested in the slot 5.

Subsequently, a two-dimensional heterostructure can be disposed between the corresponding conductors of the first coplanar waveguide 1 and the second coplanar waveguide 2 to realize the connection of the corresponding conductors (see FIG. 1A).

Figure 5:
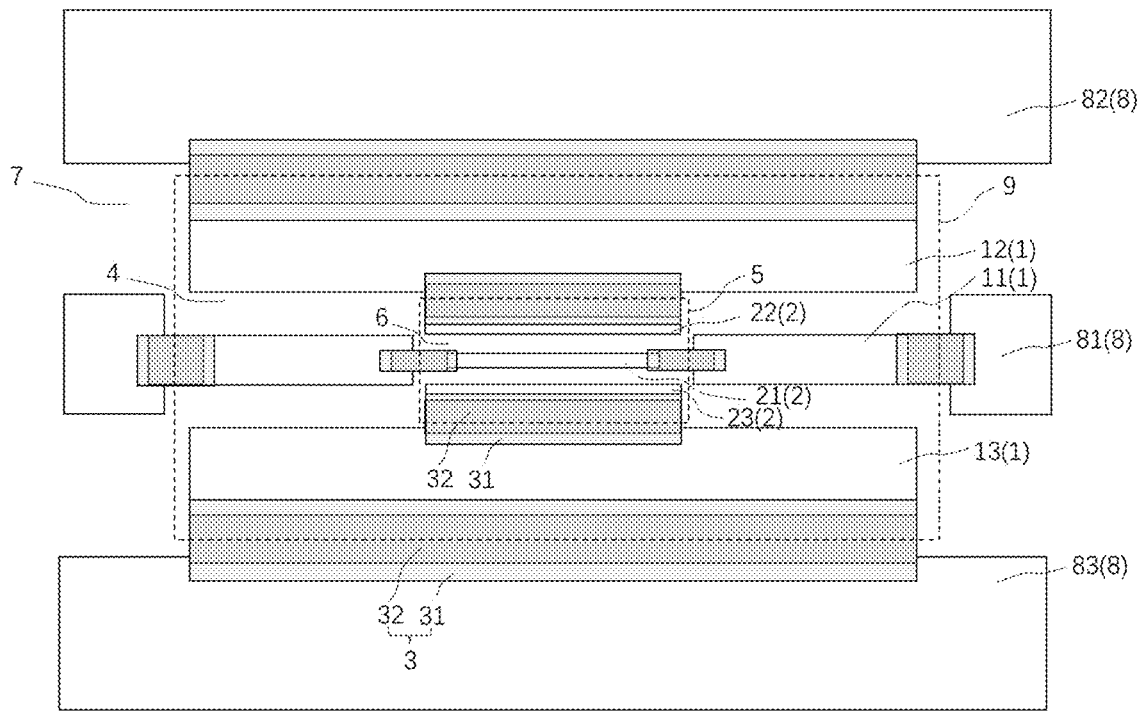
FIG. 5 is a diagram illustrating a plurality of substrates nest provided in the disclosure.

The nested structure is not limited to two substrates with different sizes, but can also be applied to the nesting of a plurality of substrates with different sizes, so as to realize the bonding among a plurality of sets of coplanar waveguides with significantly different sizes. Specifically, as shown in FIG. 5, the low-loss coplanar waveguide bonding structure further includes a third substrate 7, and the third substrate 7 is provided with a third coplanar waveguide 8 and a slot 9. The third coplanar waveguide 8 includes a signal conductor 81, a ground conductor 82 and a ground conductor 83. The first substrate 4 matches the slot 9 on the third substrate 7 in shape, so that the first substrate 4 can be nested in the slot 9, and when the first substrate 4 is nested and fixed in the slot 9, the first coplanar waveguide 1 on the first substrate 4, the second coplanar waveguide 2 on the second substrate 6, and the third coplanar waveguide 8 on the third substrate 7 are located on a same plane. To ensure accurate and firm fitting of different substrates, an adhesive can also be applied within the slot 9. The nested structure of the first substrate 4 and the second substrate 6 in FIG. 5 is consistent with that of FIG. 4, and is not described herein any more.

Subsequently, a two-dimensional heterostructure may be disposed between the corresponding conductors of the first coplanar waveguide 1 and the second coplanar waveguide 2 to realize the connection of the corresponding conductors, and the two-dimensional heterostructure 3 is disposed between the corresponding conductors of the first coplanar waveguide 1 and the third coplanar waveguide 3 to realize the connection of the corresponding conductors.

The nested structure of a plurality of substrates shown in FIG. 5 may be used for transfer between two coplanar waveguides with significantly different sizes. Taking a low-loss transmission structure of a picosecond electrical pulse signal as an example, the picosecond electrical pulse signal is transmitted from a photoconductive switch (PCS) at low loss to a transmission link of a device to be tested (DUT) and a detection system. The picosecond electrical pulse generated by the PCS needs to be connected via CPW2 (corresponding to the second coplanar waveguide 2 in FIG. 5) on a GaAs substrate (corresponding to the second substrate 6 in FIG. 5) and CPW3 (corresponding to the third coplanar waveguide 8 in FIG. 5) on a PCB board (corresponding to the third substrate 7 in FIG. 5). Since the CPW2 significantly differs from the CPW3 in size, the CPW1 (corresponding to the first coplanar waveguide 1 in FIG. 5) on a glass substrate (corresponding to the first substrate 4 in FIG. 5) is used as a transfer medium during implementation, the CPW2 and the CPW1 are connected by using the substrate nesting method and the two-dimensional heterostructure shown in FIG. 5 of the disclosure, and then the CPW1 and the CPW3 are connected similarly.

In the embodiment, the core components of the pulse signal source, the transfer medium, and the PCB circuit are processed separately, and are integrated by nesting and the two-dimensional conductive material bonding method, where the PCB circuit may be processed with a coaxial interface (such as an SMA interface) connected to the outside. The electrical signal output by the core components of the pulse signal source may be output via the CPW2-two-dimensional heterogeneous structure-CPW1-two-dimensional heterogeneous structure-CPW3-coaxial SMA interface for other tests.

The first coplanar waveguide and the second coplanar waveguide shown in FIGS. 4 and 5 significantly differ in size, so the bonding between the coplanar waveguides needs to be realized by means of nesting substrates. In addition, the size of the small-sized coplanar waveguide may also be gradually and uniformly enlarged by means of patterning, so as to be comparable to the size of the metal electrode to be connected, thereby omitting the "nesting" operation.

Figure 6:
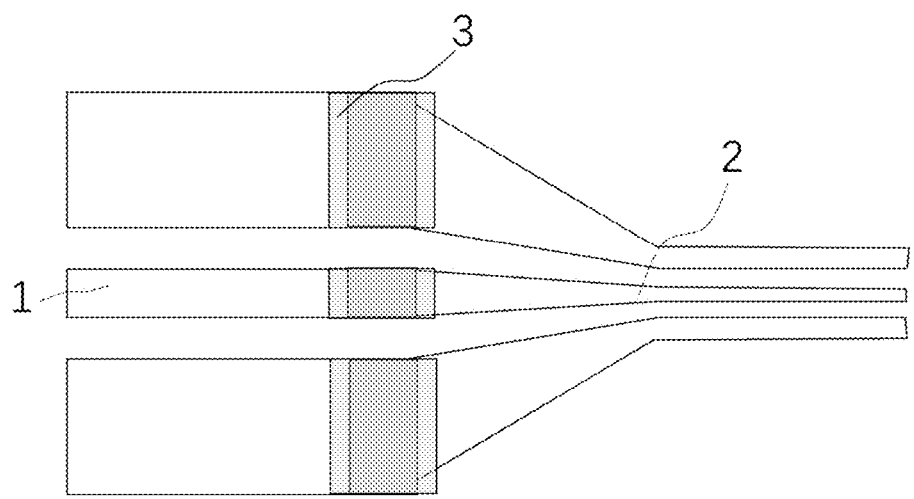
FIG. 6 is a diagram illustrating two coplanar waveguides with different sizes provided in the disclosure.

To be specific, as shown in FIG. 6, the size of the first end of each conductor of the second coplanar waveguide 2 connecting to the corresponding conductor of the first coplanar waveguide 1 is larger than that of the second end. In this case, the two-dimensional heterostructure 3 may be directly set up to realize the connection between the first coplanar waveguide and the second coplanar waveguide.

Figure 7:
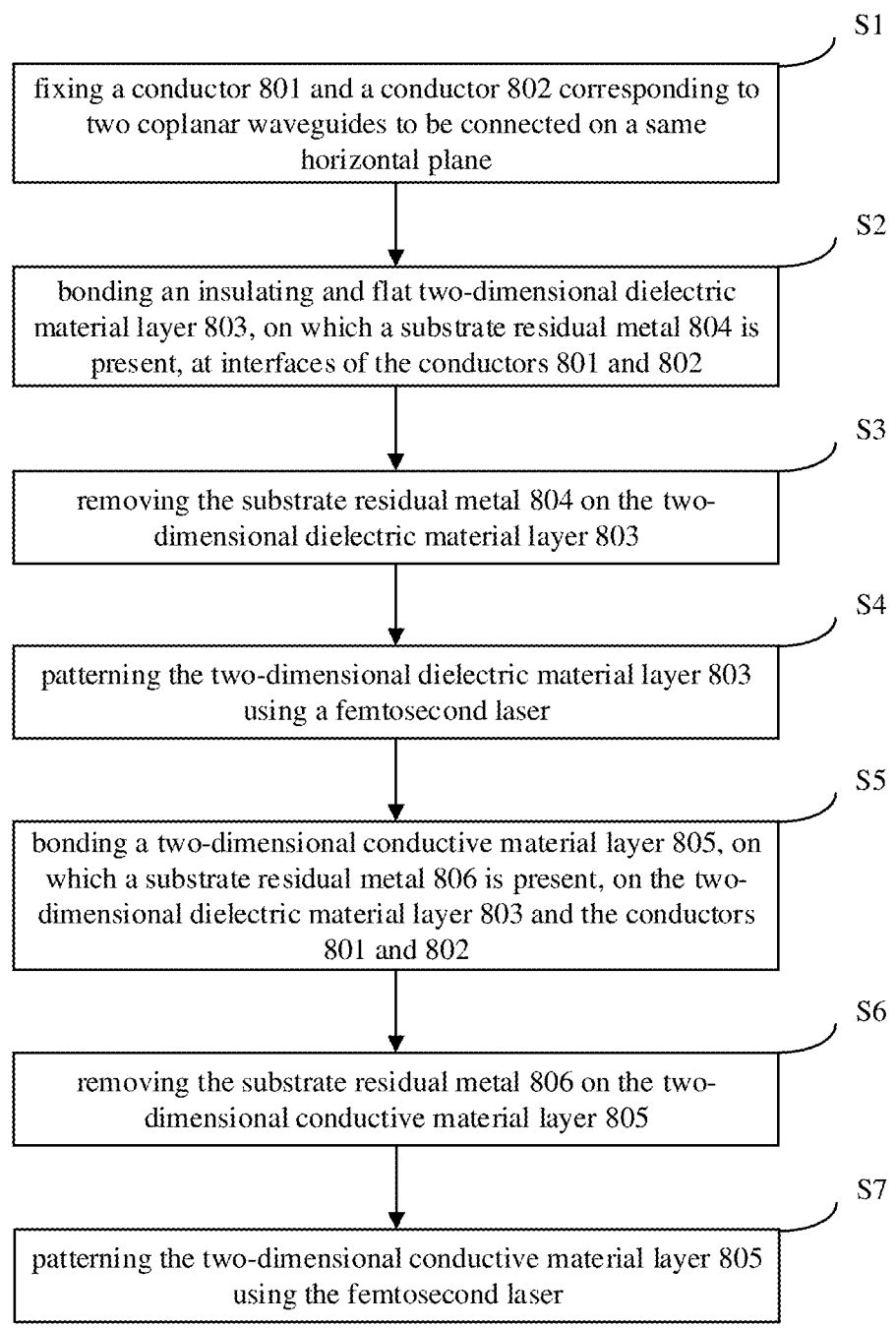
FIG. 7 is a diagram illustrating a method of manufacturing the low-loss coplanar waveguide bonding structure provided in the disclosure.
Figure 8:
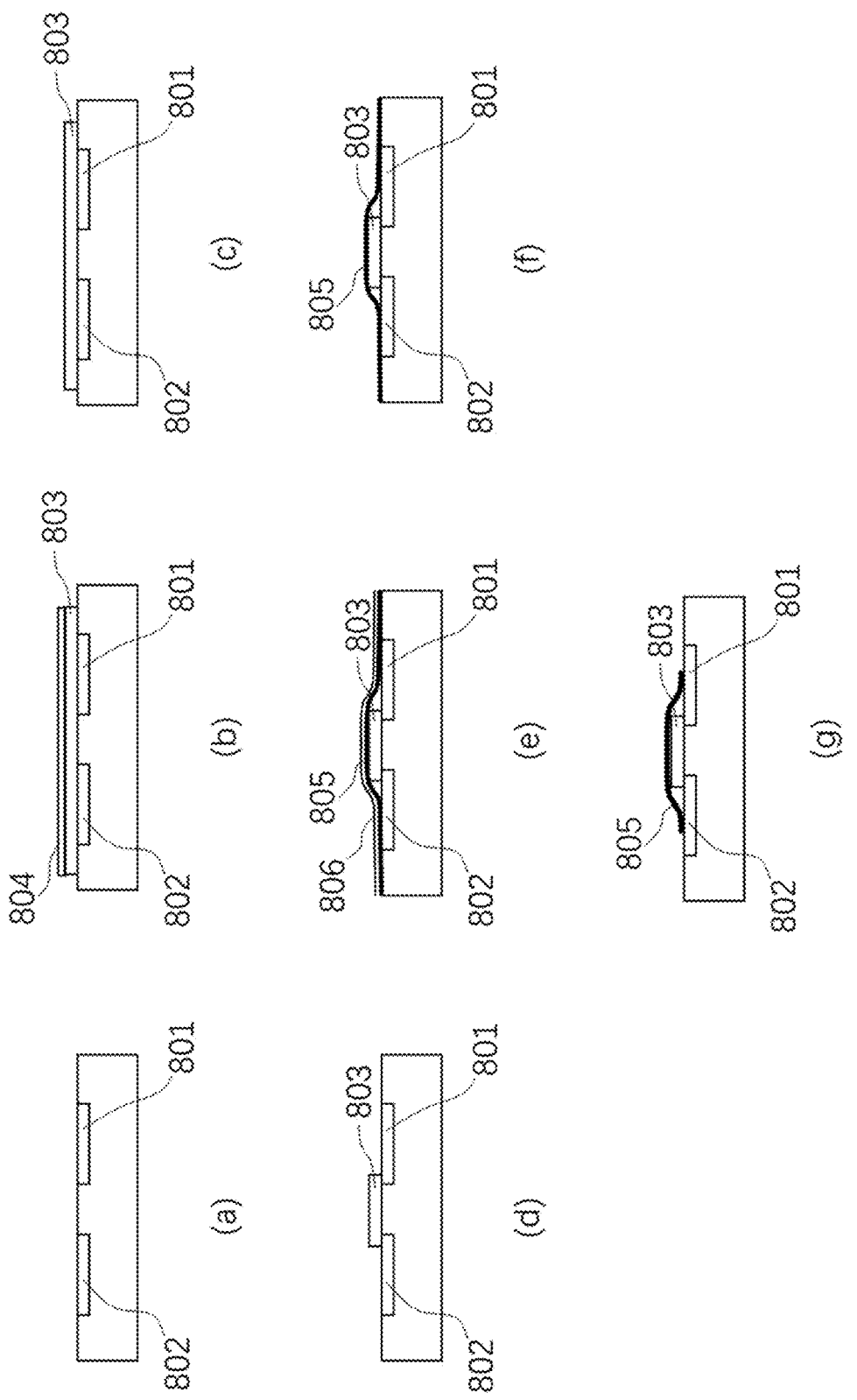
FIG. 8 is a diagram illustrating the low-loss coplanar waveguide bonding structure in the manufacturing process provided in the disclosure.

In another embodiment, the disclosure also provides a method for manufacturing the low-loss coplanar waveguide bonding structure provided in the disclosure. As shown in FIG. 7, taking the bonding of a set of corresponding conductors in the first coplanar waveguide and the second coplanar waveguide as an example (bonding of a plurality of coplanar waveguides in a similar way), the method includes:

S1: fixing a conductor 801 and a conductor 802 corresponding to two coplanar waveguides to be connected on a same horizontal plane, see (a) of FIG. 8;

S2: forming an insulating and flat two-dimensional dielectric material layer 803, on which a substrate residual metal 804 is present, at interfaces of the conductors 801 and 802, see (b) of FIG. 8;

S3: removing the substrate residual metal 804 on the two-dimensional dielectric material layer 803, see (c) of FIG. 8;

S4: patterning the two-dimensional dielectric material layer 803 using a femtosecond laser, see (d) of FIG. 8;

S5: forming a two-dimensional conductive material layer 805, on which a substrate residual metal 806 is present, on the two-dimensional dielectric material layer 803 and the conductors 801 and 802, see (e) of FIG. 8;

S6: removing the substrate residual metal 806 on the two-dimensional conductive material layer 805, see (f) of FIG. 8;

S7: patterning the two-dimensional conductive material 805 using the femtosecond laser, see (g) of FIG. 8, so that the two-dimensional conductive material layer completely covers the two-dimensional dielectric material layer and is connected to corresponding conductors of the first coplanar waveguide and the second coplanar waveguide, respectively.

The low-loss coplanar waveguide bonding structure of the disclosure has at least one of advantages as follows:

(1) The coplanar waveguides are bonded with two-dimensional conductive materials, and skin effect losses are reduced taking advantage of high electrical conductivity of the two-dimensional conductive materials.

(2) The two-dimensional conductive materials uniformly cover the conductor surfaces that needs to be connected, which improves the uniformity of the transmission line in the bonding part, ultimately reduces the high-frequency transmission reflection and guarantees the transmission bandwidth.

(3) A non-destructive contact is performed between the two-dimensional conductive materials and metals, no solder joints needs to be formed to avoid damage to metal electrodes, and connection between ultra-thin metal electrodes is applied.

(4) High-precision patterning steps are performed by controlling the bonding process in combination with laser cutting, thus bonding between coplanar waveguides with significantly different sizes can be realized.

(5) The two-dimensional material transfer process is simple and easy to bond, so that the method is highly repeatable, the yield of the process is improved, and the cost of bonding is reduced.

The various embodiments in the specification are described in a progressive manner, and the same or similar parts between the various embodiments may be referred to each other, and each embodiment focuses on the differences from the other embodiments. In the description of the specification, the description referring to the terms "one embodiment", "some embodiments", "example", "specific examples" or "some examples" means that the specific features, structures, materials or characteristics described in combination with the embodiments or examples are included in at least one embodiment or example of the embodiments of the specification.

The specific embodiments mentioned above have further described the objective, technical solutions and advantageous effects of the present disclosure in detail. It should be noted that the foregoing is merely specific embodiments of the disclosure and is not intended to limit the scope of the disclosure. Any changes, equivalent substitutions and amendments made by those skilled in the art without departing from the concepts and principles of the present disclosure shall fall within the scope of the present disclosure.

What is claimed is:

1. A low-loss coplanar waveguide bonding structure, comprising:
    a first coplanar waveguide on a first substrate;
    a second coplanar waveguide on a second substrate and having a same structure as the first coplanar waveguide; and
    a plurality of two-dimensional heterostructures uniformly covering and connecting conductors of the first coplanar waveguide and the second coplanar waveguide in a one-to-one correspondence,
    wherein the two-dimensional heterostructures comprise: a two-dimensional conductive material layer for signal transmission and a two-dimensional dielectric material layer under the two-dimensional conductive material layer,
    wherein the first substrate and the second substrate are different in materials.

2. The low-loss coplanar waveguide bonding structure according to claim 1, wherein a size of the first coplanar waveguide is larger than that of the second coplanar waveguide.

3. The low-loss coplanar waveguide bonding structure according to claim 1, wherein the first substrate comprises a slot matching the second substrate;
    the second substrate is nested and fixed in the slot, and the first coplanar waveguide and the second coplanar waveguide are located on a same plane without contact.

4. The low-loss coplanar waveguide bonding structure according to claim 1, wherein a size of a first end of each conductor of the second coplanar waveguide is larger than that of a second end, and the first end of each conductor of the second coplanar waveguide is connected to the two-dimensional heterostructures.

5. The low-loss coplanar waveguide bonding structure according to claim 1, wherein the first coplanar waveguide comprises: a GS structure, an SG structure or a GSG structure.

6. The low-loss coplanar waveguide bonding structure according to claim 1, wherein the two-dimensional conductive material layer is made from one of graphene, black phosphorus, Te, ZrGeSe or ZrGeTe.

7. The low-loss coplanar waveguide bonding structure according to claim 1, wherein the two-dimensional dielectric material layer is made from hBN or $hY_2O_3$.

8. A method for manufacturing the low-loss coplanar waveguide bonding structure according to claim 1, comprising:
    fixing a first coplanar waveguide and a second coplanar waveguide on a same horizontal plane;
    bonding an insulating and flat two-dimensional dielectric material layer at interfaces of corresponding conductors of the first coplanar waveguide and the second coplanar waveguide;
    removing a substrate residual metal on the two-dimensional dielectric material layer;
    patterning the two-dimensional dielectric material layer using femtosecond laser;
    bonding a two-dimensional conductive material layer on the two-dimensional dielectric material layer, the first coplanar waveguide and the second coplanar waveguide;
    removing a substrate residual metal on the two-dimensional conductive material layer; and
    patterning the two-dimensional conductive material layer using femtosecond laser, wherein the two-dimensional conductive material layer completely covers the two-dimensional dielectric material layer and is connected to corresponding conductors of the first coplanar waveguide and the second coplanar waveguide, respectively.

* * * * *